3,282,893
PROCESS FOR PREPARING SYNTHETIC RESINS
Leon Shechter, Summit, N.J., assignor to Union Carbide Corporation, a corporation of New York
No Drawing. Filed July 3, 1961, Ser. No. 121,322
7 Claims. (Cl. 260—47)

The present invention relates in general to the preparation of polycarbonate resins, and more particularly to an improved process for preparing polycarbonates according to the general method of ester-interchange in which steam is employed both as a purging agent and as a reactant.

It has formerly been proposed to prepare polycarbonate resins by the general method of ester interchange reaction using as reactants a diaryl carbonate, such as diphenyl carbonate, and a dihydric phenol, such as 2,2-bis-(4-hydroxyphenyl) propane, at elevated temperatures. Customarily reaction temperatures of from 150° C. to 300° C. or higher are employed for reaction periods as long as 15 or more hours whereby the polycarbonate condensation polymer is formed with the simultaneous splitting out of a monohydroxylated aryl residue of the diaryl carbonate employed as a starting material. In such a process, adequate agitation of the reaction mixture is an especial problem, particularly during the latter stages of the reaction, because of the very high melt viscosity of the polymer product. The problem is further complicated by the need for operating the process at reduced pressure to facilitate removal of the carbonate precursor and/or the monohydroxylated aryl residue. This precludes the use of heavy duty kneader or Banbury equipment.

Attempts to solve the problem by the use of a low solids solution process have proven impractical since (II)

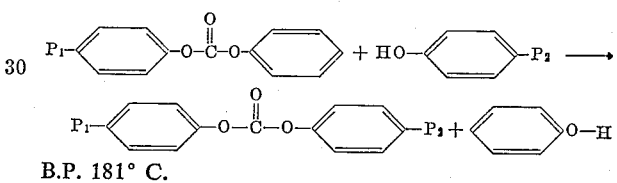

B.P. 308° C.

calculations indicate and experimental findings confirm that such a process requires excessively large volumes of solvent to be purged through the reaction system in order to obtain polymers of useful molecular weight.

Similarly emulsion and suspension polymerization methods are impractical because of the susceptibility of the polymer to water saponification, and for the further reason that, since a condensation reaction is involved, polymerization occurs only by removal of one of the reaction products.

The use of an inert gas purge, such as nitrogen, provides some improvement in that the diaryl carbonate and/or the phenol are removed from the reaction more readily and some protection against oxygen contamination is provided. Condensation of the diaryl carbonate and the phenol from the effluent gas in such a case is, however, difficult and inefficient. In addition to the economic desirability of recovering these materials, it is also desirable in order to prevent equipment fouling. Finally, contamination of waste streams with these effluents can pose a serious problem. Inert gas purges, therefore, are quite unsatisfactory.

It has now been discovered however, that the use of steam as a purging agent in the ester interchange process provides all of the advantages of an inert gas purging agent and in addition provides surprising advantages heretofore unavailable from prior known processes. Specifically, the use of a steam purge permits a faster reaction rate by sweeping out reaction by-products from the reactor, permits the use of much higher total pressure conditions, and provides protection against atmospheric oxidation which gives rise to a lighter colored polymer product.

In addition, steam has the superior property in that it provides a condensable system, thereby providing for the easy recovery of reaction by-products. Waste stream contamination problems and equipment fouling problems are avoided.

Most surprisingly, it has been discovered that dry steam as a purging agent increases the reaction rate considerably above that attained with an inert gas purge, due in large measure to the fact that steam produces a small but significant amount of hydrolysis of the intermediate polymer groups to form phenolic hydroxyl end groups. The polymer forming reaction then operates almost exclusively by virtue of the reaction of phenolic hydroxyl with aryl carbonate, e.g., phenyl carbonate, end groups to split out a phenol. This is to be distinguished from the conventional reaction mechanism involving primarily the inter se reaction between phenyl carbonate end groups on the intermediate polymer units to evolve diphenyl carbonate. These two different reactions are illustrated below in which $P_1$ and $P_2$ represent typical polycarbonate chains terminated by either the phenol or phenyl carbonate groups shown.

(I)

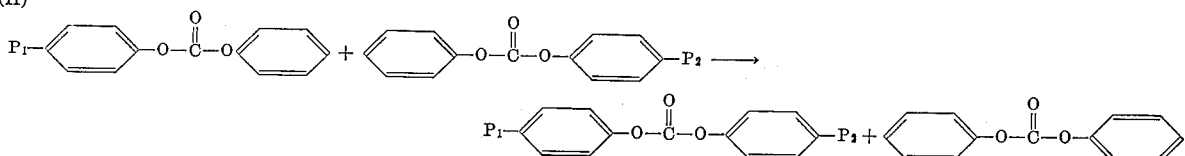

B.P. 181° C.

The reaction exemplified by (II) above is a more difficult reaction than (I), particularly near the end of the polymerization reaction where high reaction mass viscosities are encountered, principally because of the substantially less volatile nature of the diphenyl carbonate by-product.

The rate at which the steam is purged through the reaction mass is not narrowly critical and is readily determined by those skilled in the art to obtain optimum conditions in the particular reaction system employed. It has been found, however, that a rate of from about 0.1 to about 20 weight percent steam per hour based on the weight of the reactants produce generally excellent results, with from about 0.50 to about 5.0 weight percent being preferred.

Several embodiments of the present general process are suitably utilized. For instance controlled steam blanketing or purging can be used throughout the process which comprises merely admixing a dihydric phenol with a slight excess of diaryl carbonate and heating the mixture at a temperature at which the diaryl carbonate is in the molten state while simultaneously purging the reaction system with dry steam.

Preferably, however, the steam purging can be commenced at a point in the reaction at which an intermediate polycarbontae of low molecular weight has been produced and the viscosity of the reaction mass has become sufficiently high to significantly decrease the reaction rate. Ordinarily an intermediate polycarbonate having a reduced viscosity value (0.2 gm. polymer/100 ml. solution in methylene chloride at 25° C.) of up to about 0.35 is easily prepared and at a rapid rate. It is therefore, advantageous to permit the initial condensation reaction between the dihydric phenol and diaryl carbonate to proceed in the absence of steam until the intermediate polymer has attained a reduced viscosity value of from about 0.03 to about 0.35, preferably 0.1 to about 0.2 before the steam purge is begun. This procedure permits a rapid initial polymerization and the removal of much of the volatile condensation reaction by-products without the necessity of also handling the steam.

The low molecular weight intermediate polymer is thereafter, upon continued heating, condensed inter se to produce high molecular weight polymer with the evolution of diaryl carbonate and/or a phenol. In this stage of the process, the reaction mass is subjected to the purging action of the steam. To further facilitate the reaction and to promote a condensation reaction in which a phenol rather than diaryl carbonate is the by-product, the low molecular weight intermediate polymer can advantageously be admixed with a small additional quantity of diphenol or with another intermediate polycarbonate prepared by reacting an excess of dihydric phenol with the diaryl carbonate. Condensation of a phenolic end group with an aryl carbonate end group yields a phenolic by-product.

Neither the reaction temperature nor the internal pressure are narrowly critical factors, and in general are the same as suitably employed in prior known ester interchange reactions for preparing polycarbonates. Optimum reaction temperatures vary according to the individual reactants employed. Temperatures of from about 100 to 330° C. have been successfully employed, but in the main, temperatures of from about 120° C. to about 290° C. are sufficient to initiate and maintain the condensation reaction. Pressure conditions are advantageously maintained low enough to facilitate the rapid removal of the volatile reaction by-products from the reaction system. Pressures of from about 0.1 mm. Hg to about 50 mm. Hg have been found to be entirely suitable, with pressures within the range of from about 0.5 mm. Hg to about 7 mm. Hg being preferred.

The steam can be introduced into the reactor in any of the conventional ways and can be interjected into the reaction mixture per se or into the reactor over the reaction mixture. The reactants are advantageously stirred or otherwise agitated during the polymerization reaction.

Although the reaction can be carried out in the absence of a catalyst, one may, if desired, used the usual ester exchange catalyst, for instance, metallic lithium, potassium, calcium, beryllium, magnesium, zinc, cadmium, aluminum, chromium, molybdenum, iron, cobalt, nickel, silver, gold, tin, antimony, lead, barium, strontium, platinum, palladium, etc. and compounds thereof such as alcoholates, oxides, carbonates, acetates, hydrides etc. The amount of such catalyst is usualyy quite small and is of the order of 0.001 to 0.1% by weight, based on the total weight of the reactants.

Any of the dihydric phenols heretofore employed in the preparation of polycarbonate resins are suitably employed in the practice of this invention. Such dihydric phenols are usually defined as being a mononuclear or polynuclear phenol in which the two hydroxyl groups are directly attached to different nuclear carbon atoms of the same or different aromatic nucleus. The class of suitable dihydric phenols is quite large and includes those compounds described in U.S. Patent 2,950,266—Goldblum and U.S. Patent 2,964,797—Pielstöcker et al. which correspond to the general formula (I) 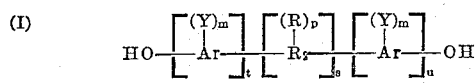

wherein R is hydrogen or a monovalent hydrocarbon radical, for example, alkyl radicals (e.g., methyl, ethyl, propyl, isopropyl, butyl, decyl, etc.), aryl radicals (e.g. phenyl, naphthyl, biphenyl, tolyl, xylyl, etc.), aralkyl radicals (e.g. benzyl, ethylphenyl, etc.), cycloaliphatic radicals (e.g. cyclopentyl, cyclohexyl, etc.) as well as monovalent hydrocarbon radicals containing inert substituents therein, such as halogen (chlorine, bromine, fluorine, etc.). It will be understood that where more than one R is used, they may be the same or different. $R_2$ is selected from the group consisting of an alkylene and alkylidene residue such as methylene, ethylene, propylene, propylidene, isopropylidene, butylene, butylidene, amylene, isoamylene, isoamylidene, cyclohexylidene, etc. $R_2$ can also be a silane radical or can be a polyoxy such as polyethoxy, polypropoxy, polythioethoxy, polybutoxy, polyphenylethoxy or polyorganosiloxy, for example, polydimethyl siloxy, polydiphenylsiloxy, polymethylphenyl siloxy, etc., or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. Ar is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers including zero. When $s$ is zero, however, either $t$ or $u$ may be zero and not both.

In the dihydric phenol compound, the substituent Y may be the same or different, as may be the R. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitro group can be represented by Y. Where $s$ is zero in Formula I, the aromatic nuclei are directly joined with no intervening alkylene or alkylidene or other bridge. The positions of the hydroxyl groups and Y on the aromatic nuclear residues Ar can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include:

2,2-bis-(4-hydroxyphenyl)-propane (Bisphenol-A);
2,4'-dihydroxydiphenyl-methane;
bis-(2-hydroxyphenyl)-methane;
bis-(4-hydroxyphenyl)-methane;
bis-(4-hydroxy-5-nitrophenyl)-methane;
bis-(4-hydroxy-2,6-dimethyl-3-methoxy-phenyl)-methane;
1,1-bis-(4-hydroxyphenyl)-ethane;
1,2-bis-(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;
3,3-bis-(4-hydroxyphenyl)-pentane;
2,2-bis-(4-hydroxyphenyl)-heptane;

bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)1,3-bis-(phenyl) propane;
2,2-bis-(4-hydroxyphenyl)-1-phenyl propane; and the like.

Also included are dihydroxybenzenes typified by hydroquinone and resorcinol, dihydroxydiphenyls such as 4,4'-dihydroxydiphenyl; 2,2' - dihydroxydiphenyl; 2,4' - dihydroxydiphenyl; dihydroxynaphthalenes such as 2,6-dihydroxynaphthalene, etc. Dihydroxy aryl sulfones such as bis - (p - hydroxyphenyl)-sulfone; 2,4'-dihydroxydiphenyl sulfone; 5'-chloro-2,4'-dihydroxydiphenyl sulfone; 5'-chloro - 2'4 - dihydroxydiphenyl sulfone; 5' - chloro-2'4-dihydroxydiphenyl sulfone; 3'-chloro-4,4'-dihydroxydiphenyl sulfone; bis-(4-hydroxy phenyl) biphenol disulfone, etc.

The preparation of these and other useful sulfones is described in Patent 2,288,282—Huissman. Polysulfones as well as substituted sulfones using halogen, nitrogen alkyl radicals, etc. are also useful. Dihydroxy aromatic ethers such as p,p'-dihydroxydiphenyl ether;
the 4,3'-, 4,2'-, 3,3'-, 2,2'-, 2,3'- etc. dihydroxydiphenyl ethers;
4,4'-dihydroxy-2,6-dimethyldiphenyl ether;
4,4'-dihydroxy-2,5-dimethyldiphenyl ether;
4,4'-dihydroxy-3,3'-di-isobutyldiphenyl ether;
4,4'-dihydroxy-3,3'-diisopropyldiphenyl ether;
4,4'-dihydroxy-3,2'-dinitrodiphenyl ether;
4,4'-dihydroxy-3,3'-dichlorodiphenyl ether;
4,4'-dihydroxy-3,3'-difluorodiphenyl ether;
4,4'-dihydroxy-2,3'-dibromodiphenyl ether;
4,4'-dihydroxydinaphthyl ether;
4,4'-dihydroxy-3,3'-dichlorodinaphthyl ether;
2,4-dihydroxytetraphenyl ether;
2,4-dihydroxytetraphenyl ether;
4,4'-dihydroxypentaphenyl ether;
4,4'-dihydroxy-2,6-dimethoxydiphenyl ether;
4,4'-dihydroxy-2,5-diethoxydiphenyl ether, etc.

Mixtures of the dihydric phenols can also be employed and where dihydric phenol is mentioned herein, mixtures of such material are considered to be included. Preferably the dihydric phenol is a gem-bis-(hydroxyphenyl)-alkane in which the central alkylidene radical contains from 1 to 6 carbon atoms.

The diaryl carbonates which are suitably employed in the practice of this invention are those represented by the general formula (II)  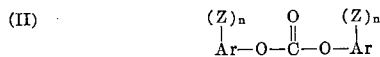

wherein Ar is an organic residue as described in connection with Formula I supra, Z is an inorganic or organic radical as represented by Y in Formula I, and $n$ is an integer. Examples of carbonate esters comprise symmetrical carbonates, for example diphenyl carbonate, di-(halo-phenyl) carbonates, e.g., di-(chlorophenyl) carbonate, di-(bromophenyl) carbonate; di-(polyhalophenyl) carbonates, e.g., di-(trichlorophenyl) carbonate, di-(tribromophenyl) carbonate, etc.; di-(alkylphenyl) carbonates, e.g., di-(tolyl) carbonate, etc., di-(naphthyl) carbonate, di-(chloronaphthyl) carbonate, etc.; unsymmetrical carbonates, for example, phenyl tolyl carbonate, chlorophenyl chloronaphthyl carbonate, trichlorophenyl chlorotolyl carbonate, etc. Mixtures of the foregoing carbonate esters can also be employed. Diphenyl carbonate is preferred.

These diaryl carbonates can be prepared by the methods described in A. F. Holliman et al., Rec. Trav. Chem., 36, 271 (1916) and Copisarow, J. Chem. Soc. (Brit.) 1929, 251, both of whom disclose preparing dicresyl carbonate by treating the alkali metal salts of p-cresol with phosgene, and U.S. Patent 2,362,865—Tryon et al., which discloses preparing diphenyl-, ditolyl-, and dinaphthyl-carbonates by passing phosgene through a column of the phenol in the presence of a catalyst, etc.

In general the term "polycarbonate" encompasses homopolymers formed from a single species of dihydric phenol such as Bisphenol-A; copolymers formed from a mixture of two or more dihydric phenols such as Bisphenol-A and the bisphenol of vinyl cyclohexene (copending application Serial No. 72,585, F. N. Apel et al. filed November 30, 1960, now abandoned); and the polycarbonate copolyesters formed from one or more dihydric phenols, a diaryl carbonate, and a dibasic carboxylic acid, the corresponding diacid chloride, or hydroxy monobasic carboxylic acid. Where copolyesters are to be prepared in accordance with this invention, some portion of the stoichiometric quantity of diaryl carbonate is replaced with the aforesaid carboxylic acid or derivative thereof. The suitable dicarboxylic acids and hydroxy carboxylic acids include in general any of the class conventionally used in the preparation of linear polyesters and can be represented by the general formula (III)  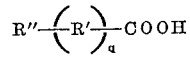

wherein R' is an alkylene, alkylidene, or cycloaliphatic groups as represented by $R_2$ in Formula I; an alkylene, alkylidene, or cycloaliphatic group containing ethylenic unsaturation; an aromatic radical such as phenylene, naphthylene, biphenylene, substituted phenylene, etc.; two or more aromatic groups connected through non-aromatic linkages such as those defined by $R_2$ in Formula I; and aralkyl radical such as tolylene, xylylene, etc. R'' is either a carboxyl or a hydroxyl group. $q$ has a value of 1 where R'' is a hydroxyl group and either zero or 1 where R'' is a carboxyl group.

Included within the scope of carboxylic acids of this invention are the saturated, aliphatic dibasic acids derived from straight chain paraffin hydrocarbons, such as oxalic, malonic, dimethyl malonic, succinic, glutaric, adipic, pimelic, suberic, azelaic and sebacic acid. Also included are the halogen-substituted aliphatic dibasic acids. Aliphatic carboxylic acids containing hetero atoms in their aliphatic chain, such as thio-diglycolic or diglycolic acid may also be used. Also useful are such unsaturated acids as maleic or fumaric.

Suitable examples of aromatic and aliphatic-aromatic dicarboxylic acids which may be used are phthalic, isophthalic, terephthalic, homophthalic, o-, m-, and p-phenylenediacetic acid; the polynuclear aromatic acids such as diphenic acids and 1,4 naphthalic acid.

Examples of hydroxy acids are the aliphatic hydroxy acids such as hydroxybutyric acid, glycolic acid, and lactic acid. Examples of aromatic and aliphatic-aromatic hydroxy acids are mandelic acid, p-, m-, and o-hydroxy benzoic acid. The hydroxy-substituted long-chain fatty acids, such as 12-hydroxystearic acid may also be used. Cycloaliphatic acids including tetrahydrophthalic tetrahydroterephthalic, and tetrahydroisophthalic.

Mixtures of the carboxylic acids can also be employed. Structural configuration of the polycarbonate homopolymers, copolymers, and copolyesters are well known in the art and are set forth in U.S. Patent 2,970,131—Moyer et al., U.S. Patent 2,950,266—Goldblum; and in copending applications Serial Nos. 846,805, 846,807 and 846,815, all filed October 16, 1959, and all now abandoned.

The following examples will serve to illustrate the practice of the present invention using specific reactants and operating conditions. The examples are intended in no

Example 1

A low molecular weight polycarbonate is first prepared by admixing 2,2-bis-(4-hydroxyphenyl) propane with a stoichiometric excess of diphenyl carbonate (from 1 to 100 percent molar excess) and heating the resulting mixture in contact with lithium hydroxide at a pressure of about 10 mm. Hg. The initial reaction temperature is 100° C. and increases to about 225° C. during the course of the reaction while phenol is removed by distillation. Upon substantially complete removal of the phenol, the pressure of the reaction system is decreased to 1–5 mm. Hg and heating is resumed to raise the temperature to 250° C., thereby coupling some of the phenyl carbonate terminated reaction products and distilling off a small quantity of diphenyl carbonate. The intermediate polycarbonate resin product has a reduced viscosity value (0.2 gm. polymer/100 ml. methylene chloride solution at 25° C.) of from 0.03 to 0.37 (usually between 0.1 and 0.2) and has an average $n$ value in the following structural formula of between about 20 and 40.

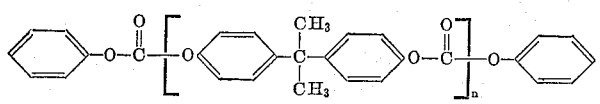

This low molecular weight polycarbonate is charged to a reactor fitted with a heavy duty agitator and further reacted at 240–280° C. and 2–6 mm. Hg pressure using steam as a purging gas. As the reaction progresses, phenol is evolved and the polymer increases in viscosity. Condensation and recovery of the steam-phenol distillate is accomplished readily. At the desired viscosity the steam is turned off and the polymer discharged.

Example 2

To a rotor mill equipped with a steam inlet, vacuum system, condenser, and receiver were charged 2 grams 2,2-bis-(4-hydroxyphenyl) propane and 203 grams of an intermediate polycarbonate prepared by reacting, in the presence of LiOH catalyst, 1 mole 2,2-bis-(4-hydroxyphenyl) propane and 1.05 moles diphenyl carbonate. The intermediate polymer had a reduced viscosity value (0.2 gm. polymer/100 ml. methylene chloride solution at 25° C.) of 0.21. The reactor was heated to 190° C., a small stream of steam was bled into the reactor, and the pressure was reduced to 5 mm. Hg. Over a period of 1 hour the temperature was raised to 240° C., and thereafter the temperature was maintained between 240° and 250° C. and pressure at 5 mm. Hg. After 4 hours of reaction, 8 gms. of distillate consisting of a mixture of phenol and water had been collected. At this point, the reaction was stopped and the polymer was discharged. The following properties were measured:

Reduced viscosity _____ 0.45
Melt flow at 260° C. (44 p.s.i.) _____ [1] 10.5

[1] ASTM D–1238–57T.

Infrared analysis of a 5 mil film showed substantial absorption bands in both the 2.8 and 14.55 micron regions (OH and monosubstituted benzene) indicating that although hydrolysis had occurred a substantial number of phenyl carbonate end groups remained to afford further increase in chain length on further reaction. The polymer was completely soluble in methylene chloride.

Example 3

To substantially the same apparatus as in Example 2, 200 grams of a 2,2-bis(4-hydroxyphenyl) propane polycarbonate homopolymer having a reduced viscosity value of 0.20 (0.2 gm./100 ml./CH$_2$Cl$_2$ at 25° C.) was charged. This intermediate polymer was heated to 200° C., a small stream of dry steam was fed to the reactor, and the pressure reduced to 7 mm. Hg. Over a period of 1 hour the temperature was raised to 240° C., and thereafter maintained at 240–250° C. After 1 hour and 50 minutes of reaction at 7 mm. Hg pressure, 5.3 gms. of distillate consisting of a mixture of phenol and water had been collected. At this point the reaction was stopped and the polymer discharged. The reduced viscosity value (0.2 gm./100 ml. CH$_2$Cl$_2$ at 25° C.) was found to be 0.42. Infra-red examination showed the presence of both types of end-groups as in Example 1.

Example 4

(A) Procedure and charge were the same as Example 3.

After 2½ hours at 240–250° C. and 6–7 mm. Hg 9.5 gms. of distillate consisting of a mixture of phenol and water had been collected. At this point, the reaction was stopped and the polymer discharged. The following properties were measured:

Reduced viscosity _____ 0.63
Melt flow at 260° C. _____ decigrams/min__ 2.5

The polymer was completely soluble in CH$_2$Cl$_2$ and, on saponification with methanolic-ammonia, 2,2-bis-(4-hydroxyphenyl) propane of the same purity as the starting material was recovered.

(B) An attempt was made to advance the low molecular weight ester exchange intermediate of Part A to a high molecular weight polymer by omitting the steam purge and using nitrogen as purge gas.

To a reaction vessel fitted with nitrogen inlet and necessary vacuum system with condenser and receiver was added 200 grams of the polycarbonate intermediate. Reaction was carried out as in part (A) above except that nitrogen gas was used as the purging agent. The following results were obtained:

| Hours reacted at 240-250° C. | Product | |
|---|---|---|
| | R. V.[1] | Melt flow at 260° C. |
| 1 | 0.33 | 50 |
| 2¼ | 0.44 | 11.4 |
| 3 | 0.55 | 4 |

[1] Reduced viscosity (0.2 gm./100 ml. methylene chloride at 25° C.)

Only a trace of distillate (phenol + diphenyl carbonate) was recovered in this example and considerable fouling and plugging of vacuum lines was encountered.

(C) Conditions and charge were same as in part (A) and (B) except that no gas purge was used and a pressure of 2.5 mm. Hg was maintained. The following results were obtained:

| Hours reacted at 240-250° C. | Pressure (mm.) | Product | |
|---|---|---|---|
| | | R.V. | Melt flow |
| 1 | 2.5 | 0.36 | 42 |
| 3½ | 2.5 | 0.42 | 12.7 |

Again only a trace of distillate (principally diphenyl carbonate) was isolated and fouling and plugging of vacuum lines was encountered.

The polymers prepared by the process of this invention are useful in any applications where tough, flexible, plastic materials are required such as packaging films, fibers, bristles, molded articles, electrical insulating coatings and the like. In applications requiring water free resins, the polymer masses produced directly by the present novel steam purge process are readily dried by conventional vacuum drying procedures.

What is claimed is:

1. In the process for preparing polycarbonate resins which comprises condensing a dihydric phenol with a diaryl carbonate at elevated temperatures and under reduced pressure, the improvement which consists in purging through the reaction mass during the condensation reaction from about 0.1 to about 20.0 weight percent steam per hour based on the weight of reactants.

2. The process for preparing high molecular weight polycarbonate resins which comprises heating and condensing an aryl carbonate-terminated low molecular weight polycarbonate resin under reduced pressure while purging the reaction system with steam in an amount of from about 0.1 to about 20 weight percent per hour based on the weight of said low molecular weight polycarbonate for a period of time sufficient to increase the molecular weight of said intermediate polymer.

3. The process according to claim 2 wherein the condensation reaction mass is purged with steam at a rate of from about 0.50 to about 5.0 weight percent per hour based on the weight of the low molecular weight polymer initially present.

4. The process according to claim 3 wherein the pressure in the reaction system is maintained within the range of from about 0.1 mm. to about 50 mm. Hg.

5. The process for preparing a high molecular weight polycarbonate resin which comprises heating and condensing a gem-bis-(4-hydroxyphenyl) alkane containing from 1 to 6 carbon atoms in the central alkylidene group with a diaryl carbonate to form an intermediate polymer having a reduced viscosity value of from about 0.03 to about 0.35, and thereafter further heating said intermediate polymer at reduced pressures while purging the reaction system with from about 0.1 to about 20 weight percent steam per hour based on the weight of said intermediate polymer.

6. The process according to claim 5 wherein the steam is purged through the reaction system at a rate of from about 0.50 to about 5.0 weight percent per hour based on the weight of the intermediate polymer.

7. The processs according to claim 5 wherein the gem-bis-(4-hydroxyphenol) alkane is 2,2-bis-(4-hydroxyphenyl) propane and the diaryl carbonate is diphenyl carbonate.

References Cited by the Examiner

UNITED STATES PATENTS

| | | | |
|---|---|---|---|
| 2,768,868 | 10/1956 | Hewett et al. | 8—130.1 |
| 2,836,571 | 5/1958 | Hall | 260—2 |
| 3,014,891 | 12/1961 | Goldblum | 260—47 |

SAMUEL H. BLECH, *Primary Examiner.*

HAROLD BURSTEIN, *Examiner.*

J. C. MARTIN, *Assistant Examiner.*